United States Patent [19]

Maslanka

[11] Patent Number: 5,668,246
[45] Date of Patent: Sep. 16, 1997

[54] SYNTHESIS OF HIGH SOLIDS-CONTENT WET-STRENGTH RESIN

[75] Inventor: William W. Maslanka, Landenberg, Pa.

[73] Assignee: Hercules Incorporated, Wilmington, Del.

[21] Appl. No.: 695,258

[22] Filed: Aug. 9, 1996

Related U.S. Application Data

[63] Continuation of Ser. No. 344,779, Nov. 23, 1994, abandoned, which is a continuation of Ser. No. 932,817, Aug. 20, 1992, abandoned, which is a continuation of Ser. No. 659,552, Feb. 22, 1991, abandoned, which is a continuation-in-part of Ser. No. 634,355, Dec. 31, 1990, abandoned.

[51] Int. Cl.$^6$ .................................................. C08G 69/28
[52] U.S. Cl. ..................... 528/336; 528/335; 528/342; 524/606; 524/608; 524/802
[58] Field of Search .......................... 528/336, 335, 528/342; 524/606, 608, 802

[56] References Cited

U.S. PATENT DOCUMENTS

| | | | |
|---|---|---|---|
| 2,926,116 | 2/1960 | Keim | 162/164 |
| 2,926,154 | 2/1960 | Keim | 260/29.2 |
| 3,086,961 | 4/1963 | House et al. | 260/75 |
| 3,320,215 | 5/1967 | Combs et al. | 260/78 |
| 3,352,833 | 11/1967 | Earle, Jr. | 260/78 |
| 3,891,589 | 6/1975 | Ray-Chaudhuri | 260/29.2 EP |
| 3,951,921 | 4/1976 | Espy et al. | 260/78 SC |
| 4,287,110 | 9/1981 | Takagishi et al. | 260/29.2 EP |
| 4,336,835 | 6/1982 | Takagishi | 162/164.3 |
| 4,487,884 | 12/1984 | Maslanka | 524/845 |
| 4,515,657 | 5/1985 | Maslanka | 162/164.3 |
| 4,853,431 | 8/1989 | Miller | 524/608 |
| 5,017,642 | 5/1991 | Hasegawa et al. | 524/608 |

FOREIGN PATENT DOCUMENTS

| | | | |
|---|---|---|---|
| 979579 | 12/1975 | Canada | 402/62 |
| 0320121 | 6/1989 | European Pat. Off. . | |
| 0374938 | 6/1990 | European Pat. Off. . | |
| 5229795 | 8/1977 | Japan | C08G 9/48 |

OTHER PUBLICATIONS

Ex parte Eastwood, 163 U.S.P.Q. 316 (P.O.B.A. 1969)—pp. 383–384.
Ex parte Shea, 171 U.S.P.Q. 383 (P.O.B.A. 1971) —pp. 316–318.
On–Line Abstract of Japanese Pat. No. JP–B–7729795 assigned to Hercules Incorporated, from World Patent Index, (WPI) Record No. 935902.

*Primary Examiner*—James J. Seidleck
*Assistant Examiner*—Duc Truong
*Attorney, Agent, or Firm*—Ivan G. Szanto

[57] ABSTRACT

Disclosed is an improvement in a method of making a water-soluble epichlorohydrin resin involving reacting epichlorohydrin with a polyaminoamide. The improvement involves preparing the polyaminoamide in the presence of an acid catalyst (low temperature condensation) followed by reaction with epichlorohydrin.

6 Claims, No Drawings

SYNTHESIS OF HIGH SOLIDS-CONTENT WET-STRENGTH RESIN

This application is a continuation of application Ser. No. 08/344,779, filed Nov. 23, 1994 now abandoned, which is a continuation of application Ser. No. 07/932,817, filed Aug. 20, 1992 now abandoned, which is a continuation of Ser. No. 07/659,552, filed Feb. 22, 1991 now abandoned, which is a continuation-in-part of Ser. No. 07/634,355 filed Dec. 31, 1990 now abandoned.

The present invention relates to a method of making a wet-strength agent useful in papermaking. In particular, the present invention relates to a wet-strength resin that is the reaction product of a polyaminoamide and epichlorohydrin.

Synthetic water-soluble epichlorohydrin resins, such as polyaminoamide-epichlorohydrin wet-strength resins, are used, for example, in manufacturing paper. Procedures for making polyaminoamide-epichlorohydrin resins are well known. Typically, such procedures involve reacting a polyamine with epichlorohydrin in an aqueous solution and diluting the reaction product to a desired solids content. A higher solids content is desireable in the final product so that less of the product, e.g., a wet-strength agent for paper, need be added to obtain the desired result.

Depending on the solids content of the final product, the pH of the product is adjusted for storage stability. Ordinarily, the higher the solids content the lower the pH must be maintained in order to provide for suitable storage stability, i.e., to prevent the material from forming a gel. However, there was an upper limit to the amount of solids that could be included in known products, since lowering the pH below a certain level resulted in hydrolyzing the known polyaminoamide-epichlorohydrin resins. Accordingly, it would be advantageous to develop a water-soluble, cationic polyaminoamide-epichlorohydrin resin that could be maintained in solution at a high solids content without the need to lower the pH of the solution to cause the resin to hydrolyze.

Accordingly, the present invention provides an improvement in a method of making a polyaminoamide comprising reacting a dibasic carboxylic acid with a polyalkylene polyamine, the improvement comprising reacting the dibasic carboxylic acid and the polyalkylene polyamine in the presence of an acid catalyst in two stages wherein in the first stage the temperature is maintained at from about 30° C. to about 50° C., and in the second stage the temperature is maintained at from about 55° C. to about 75° C. The present invention also provides an aqueous composition comprising a solution of a cationic, water-soluble, polyamino-epichlorohydrin resin having a total solids content of at least 25% by weight. The present invention further provides a paper product having improved wet strength comprising sheeted cellulosic fibers treated with the composition of the present invention, and a method of using the composition of the present invention comprising incorporating the composition into a paper product.

Reaction techniques that are modified as described below in accordance with the present invention for making the polyaminoamide are well known, such as disclosed in U.S. Pat. Nos. 2,926,116, 2,926,154, and 3,352,833, the disclosures of which are incorporated herein by reference. Such procedures involve reacting a dibasic carboxylic acid and a polyalkylenepolyamine. The acid residues can be aliphatic, aromatic, or aralkyl, and can contain between 3 and 12 carbon atoms. The aliphatic acid residues can be linear or cyclic. Preferred acid residues are adipoyl and glutaroyl. The polyalkylenepolyamine residues generally contain at least one secondary amino group and can be tri-, tetra-, penta-, or higher amines, and can also contain another amine or other functionality. The amino groups in the polyalkylenepolyamine can be connected by aliphatic residues such as ethylene or trimethylene groups, or aromatic residues such as phenylene, aralkyl residues such as xylyl. The mole ratio of dibasic acid residue precursor to polyamine residue is preferably 0.9–1.1. Preferred polyalkylenepolyamines include diethylenetriamine, triethylenetetramine, tetraethylenepentamine, iminobispropylamine, and dipropylenetriamine. The reaction is modified in accordance with the present invention by being conducted in the presence of an acid catalyst. Useful acid catalysts include mineral acids, such as hydrohalide acids including HCl, HBr, and HI, sulfuric acid, and phosphoric acid as well as organic acids such as formic acid, acetic acid, and sulfonic acids including benzenesulfonic acid and p-toluenesulfonic acid. The acid catalyst is employed at an amount of 0.05–4 moles per 100 moles of polyalkylenepolyamine. Generally, the reaction can be carried out at a temperature of 110°–250° C., preferably about 145°–165° C., more preferably about 154°–155° C. The time of reaction depends on the temperatures and pressures utilized and will ordinarily vary between 4 and 10 hours, preferably about 6 hours. Generally, the reaction continues until an intrinsic viscosity (I.V.) of 0.12±0.005 (1M $NH_4Cl$, 2%, 25° C.) is attained. The reaction results in formation of a polyaminoamide having secondary amine functionality of the formula

—(R—NH—R)— wherein R and R is the polymeric backbone.

Further in accordance with the present invention, the polyaminoamide is reacted with epichlorohydrin

to form a water-soluble, cationic, thermosetting resin useful as a wet-strength agent in paper making. The temperature at which the reaction is conducted is preferably conducted in two stages. In the first stage, the reaction mixture is maintained at 30°–50° C., 39°–41° C. Reaction time for the first stage is, preferably about 90–190 minutes, to form an intermediate polyaminochlorohydrin

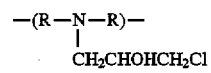

wherein R and R are as defined hereinabove. Then the reaction temperature is gradually increased to 55°–75° C. such that the intermediate polyaminochlorohydrin is controllably cross-linked to a determined level. The second stage is continued until the viscosity of the reaction mixture reaches the desired level, which is preferably at a Gardner-Holdt viscosity of M to N.

The reaction is carried out such that the molar ratio of epichlorohydrin to the polyaminoamide is 1.7/1 to 1.9/1. Broadly speaking, the reaction can be carried out neat or in an aqueous solution of up to 57 weight % water. Preferably, the polyaminoamide is reacted with epichlorohydrin in an aqueous solution of 52–57 weight % water, that is, a solution of 43–48 weight % total solids (the weight percentage of the solution that is solubilized solid material), more preferably about 45 weight % total solids. Reaction time varies depending on the temperature, with lower temperatures taking longer times. Reaction is preferably carried out until all, or substantially all of the available amine groups on the polyaminoamide are reacted with epichlorohydrin. Generally, reaction times vary between about 1 and 19 hours, preferably between 3 and 6 hours. Because the reaction is exothermic, the epichlorohydrin is added slowly over time to the polyaminoamide to allow for more effective heat transfer from the reaction medium. Heat transfer from the reaction medium can be accomplished according to known procedures, such as immersing the reaction vessel in a refrigerated environment, e.g., an ice bath, or passing refrigerated coils inside the reaction vessel. The resultant mixture provides and aqueous composition having at least 25% by weight of total solids, preferably at a pH of 3.6–3.9.

The polyaminoamide-epichlorohydrin resins of the present invention are useful as wet strength agents for paper materials, such as paper towels, absorbent tissue, wrapping paper, and bag paper. Preformed or partially dried paper can be impregnated by immersion in the resin or by spraying the resin on the paper, followed by which the paper can be heated for about 0.5–30 minutes at temperatures of about 80° C. or higher to fully cure the thermosetting resin to a water-insoluble material.

The resin is incorporated in paper at preferred amounts of about 0.1–5% by dry weight of the paper. Quantities of resin added to aqueous paper stock will depend on the degree of wet strength desired in the finished product and on the amount of resin retained by the paper fibers.

To more clearly describe the present invention, the following non-limiting examples are provided. In the examples are parts and percentages are by weight unless indicated otherwise.

EXAMPLE 1

A polyaminoamide is prepared in accordance with the present invention. Diethylenetriamine (206.4 g, 2.0 moles) is charged to the reaction vessel with 23.0 g 12.7% HCl. Adipic acid (295.2 g, 2.02 moles) is added over 1 hour. After the acid is added, the reaction mixture is heated to 145°–147° C. and held for 8.5 hours while distilling out the water of polycondensation. The contents of the reactor are diluted to ~50% solids and cooled to room temperature. Intrinsic viscosity=0.119 (1M $NH_4Cl$, 2%, 25° C.).

EXAMPLE 2

This example demonstrates the synthesis of high solids resin from poly(adipic acid-co-diethylenetriamine). A portion (137.2 g, 275.5 g 49.8% solution, 0.64 mole) of the polyamide from Example 1 is charged to the reaction flask and diluted to a total weight of 584 g. This solution is warmed to 30° C. and epichlorohydrin (100.4 g, 1.09 moles) added over 30 minutes. The temperature is raised to 40° C. and the contents of the flask held for 130 minutes followed by raising to 65° C. and monitoring the viscosity. At a Gardner-Holdt viscosity of "N+", 4.9 g 96.3% $H_2SO_4$ is added to give a pH of 3.9. The sample is divided into four parts.

| Sample | % Solids | Storage Stability |
| --- | --- | --- |
| A | 32.9% | Gelled in 32 days |
| B | 30.0% | >90 day stability at 90° F. |
| C | 27.5% | >90 day stability at 90° F. |
| D | 24.8% | >90 day stability at 90° F. |

As indicated, the gel stability of this resin is excellent at 30% solids and below. Raising the solids above 30% resulted in reduced storage stability.

EXAMPLE 3

Resins made in accordance with Example 2 are evaluated in handsheets prepared from a 50:50 blend of Rayonier bleached Kraft and Weyerhaeuser bleached hardwood Kraft pulps beaten at a consistency of 4.5% in a cycle beater to a Canadian standard freeness of 500 cc. The pH of the pulp slurry is adjusted to 7.5 and the pulp diluted to 0.25% consistency in the proportioner of a standard Noble and Wood handsheet machine. The resin is added to the proportioner at a level to give 0.5% resin based on pulp. The pulp stock is then formed into handsheets having a basis weight of 40 lbs/ream (ream=24"×36"—500 sheets). The sheets are dried to a moisture content of about 5%.

A portion of the sheets are cured for 30 minutes at 80° C. The dried (uncured) and heated (cured) sheets are tested for dry strength and for wet strength (after soaking for 2 hours at 20° C. in distilled water).

Wet and dry tensile values are determined by exerting tension on a 6"×½" strip of the paper in question at a rate of 2–3"/min and determining the maximum tensile strength (lbs/in width) at failure (TAPPI METHOD T-494). The resins are stored at 90° C. and tested initially and on a monthly basis for 3 months. Table 2 shows this data.

TABLE 2

| Designation | Basis Weight (24" × 36" - 500 sheets) | Tensile (lbs/in Width) 6" Span, ½" Strip, 2–3"/Min T/A Cured 30 min at 80° C. | | |
| --- | --- | --- | --- | --- |
| | | Dry | Wet[a] | % W/D |
| Initial | | | | |
| A | 41.0 | 22.7 | 4.82 | 21.2 |
| B | 41.5 | 23.5 | 5.02 | 21.4 |
| C | 41.2 | 23.1 | 4.82 | 20.9 |
| D | 41.2 | 23.6 | 4.87 | 20.6 |
| After 1 month at 90° F. | | | | |
| A | Gelled | — | — | — |
| B | 40.5 | 24.6 | 4.82 | 19.6 |
| C | 40.2 | 24.2 | 4.78 | 19.8 |
| D | 40.4 | 25.1 | 4.79 | 19.1 |
| After 2 months at 90° F. | | | | |
| A | Gelled | — | — | — |
| B | 40.5 | 23.9 | 4.42 | 18.6 |
| C | 40.2 | 22.3 | 4.22 | 19.0 |
| D | 40.6 | 22.4 | 4.15 | 18.6 |
| After 3 months at 90° F. | | | | |
| A | Gelled | — | — | — |
| C | 39.7 | 23.6 | 4.54 | 19.3 |
| D | 39.9 | 23.0 | 4.63 | 20.1 |

[a] after 2-hour soak in water

EXAMPLE 4

A polyaminoamide is made in accordance with the present invention. Diethylenetriamine (206.4 g, 2.0 moles) is charged to the reaction vessel with 15.7 g 25% $H_2SO_4$. Adipic acid (295.2 g, 2.02 moles) is added over 1 hour. After the acid is added, the reaction mixture is heated to 155° C. and held for 5.5 hours while distilling out the water of polycondensation. The contents of the reactor are diluted to approximately 50% solids and cooled to room temperature. Intrinsic viscosity=0.115 (1M $NH_4Cl$, 2%, 25° C.).

EXAMPLE 5

This example demonstrates synthesis of high solids resin from poly(adipic acid-co-diethylenetriamine). A portion (62.5 g, 116.2 g 53.8% solution, 0.29 mole) of the polyamide from Example 4 is charged to the reaction flask and diluted to a total weight of 275 g. The solution is warmed to 30° C. and epichlorohydrin (50.4 g, 0.54 mole) added over 30 minutes. The temperature is raised to 40° C. and the contents of the flask held for 130 minutes followed by raising to 75° C. and monitoring the viscosity. At a Gardner-Holdt viscosity of "M+", 22 cc of water and 2.7 g of 96.3% $H_2SO_4$ are added followed by cooling to room temperature. The resultant product has a total solids of 29.0% and pH of 3.6. The Brookfield viscosity is 205 cps.

EXAMPLE 6

The resin of Example 5 is evaluated as in Example 3. Table 3 presents the 3-month efficiency versus aging data.

TABLE 3

| Designation | Basis Weight 24" × 36"- 500 sheets) | Tensile (lbs/in Width) 6" Span, ½" Strip, 2-3"/Min T/A Cured 30 min at 80° C. | | |
|---|---|---|---|---|
| | | Dry | Wet[a] | % W/D |
| Initial | 40.0 | 23.9 | 4.73 | 19.9 |
| After 1 month at 90° F. | 39.9 | 21.5 | 4.10 | 19.3 |
| After 2 months at 90° F. | 39.8 | 22.1 | 3.66 | 16.6 |
| After 3 months at 90 ° F. | 39.9 | 22.3 | 3.85 | 17.3 |

[a]after 2-hour soak in water

Claimed is:

1. A method comprising reacting dicarboxylic acid and a polyalkylenepolyamine in the presence of an acid catalyst to form a polyaminoamide and reacting the polyaminoamide with epichlorohydrin in two stages to form a water-soluble, stable, cationic polyamino-epichlorohydrin wet strength resin, which does not gel when held at 90° F. for 90 days and has a total solids content of at least about 25%, wherein in the first stage the temperature is maintained at from about 30° C. to about 50° C., and in the second stage the temperature is maintained at from about 55° C. to about 75° C. such that the temperature in the second stage is different from the temperature in the first stage, the reaction being carried out in a manner such that the molar ratio of epichlorohydrin to the polyaminoamide is from about 1.7/1 to about 1.9/1.

2. The method of claim 1 wherein in the first stage the temperature is maintained at from about 39° C. to about 41° C.

3. The method of claim 1 wherein the epichlorohydrin is reacted with the polyaminoamide in an aqueous solution at a total solids content of 43–48 weight %.

4. The method defined by claim 1, further comprising adjusting the resultant mixture to provide an aqueous composition having at least 25 wt. % total solids.

5. The method defined by claim 4, wherein the total solids are adjusted to a level up to 30 wt. % total solids.

6. The method defined by claim 4, further comprising adjusting the resultant mixture to a pH of 3.6–3.9.

* * * * *

UNITED STATES PATENT AND TRADEMARK OFFICE
CERTIFICATE OF CORRECTION

PATENT NO. : 5,668,246
DATED : 9/16/97
INVENTOR(S) : Maslanka, William W.

It is certified that error appears in the above-identified patent and that said Letters Patent is hereby corrected as shown below:

Column 2, line 40 delete "preferably".

Column 2, line 58, after "1.71/1" insert -- and preferably up to -- 1.9/1.

Column 3, line 12, replace "and" with -- an --.

Column 3, line 51, insert -- (Giving a mole ratio of epichlorohydrin:polyamide of slightly over 1.7:1). --

Column 5, line 3, insert -- "Giving a mole ratio of epichlorohydrin:polyamide of slightly over 1.86:1). --

Signed and Sealed this

Fourth Day of August, 1998

Attest:

BRUCE LEHMAN

Attesting Officer

Commissioner of Patents and Trademarks